June 21, 1960  S. KUBA ET AL  2,942,093
ARTICLE ASSEMBLING APPARATUS
Filed July 24, 1958  4 Sheets-Sheet 1
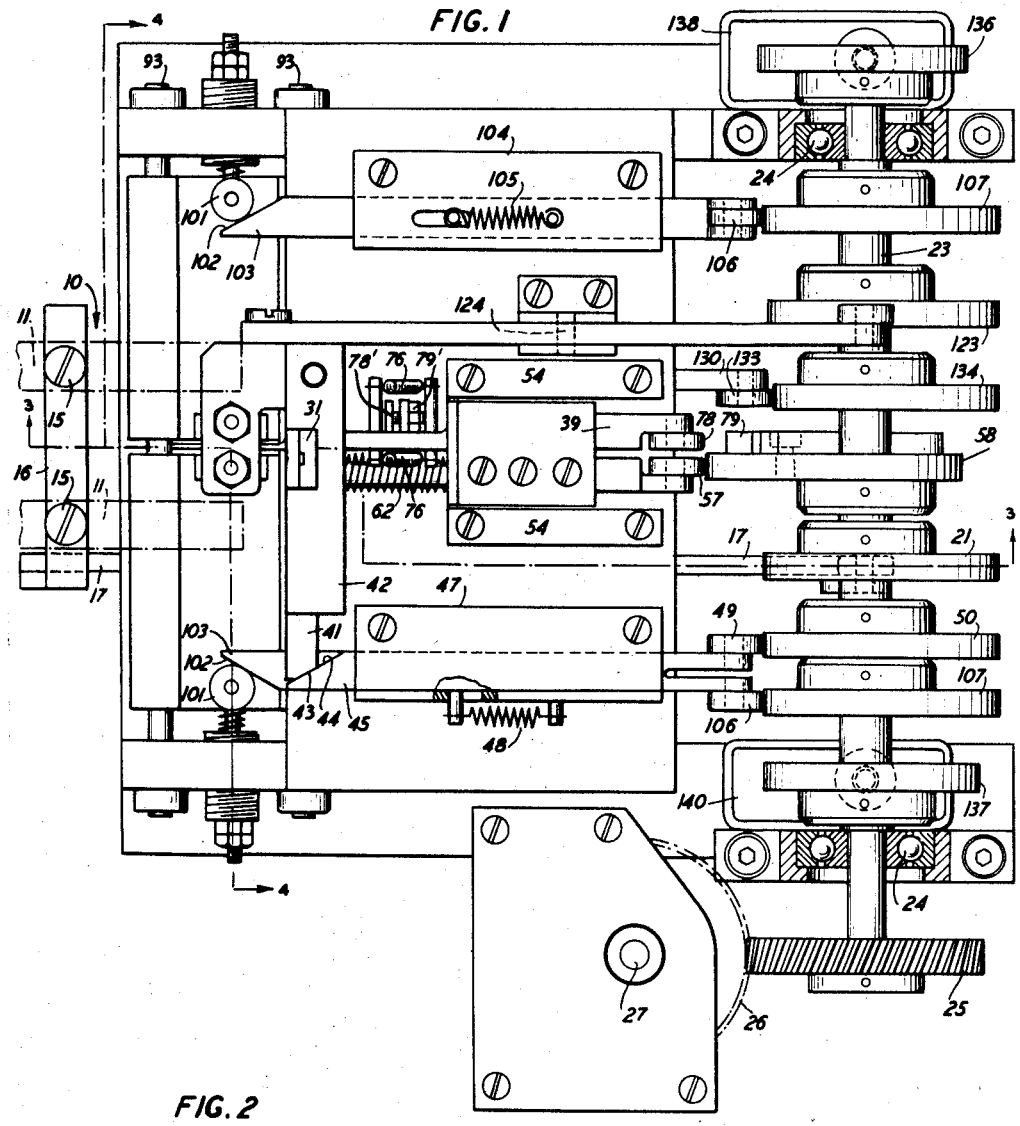
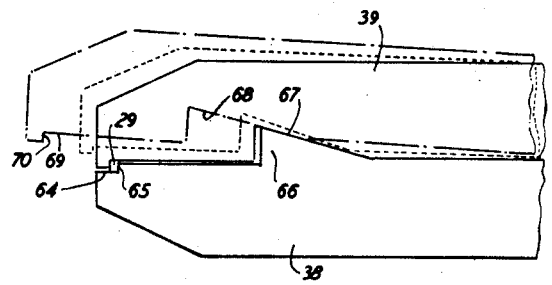
INVENTORS: S. KUBA
R.C. SHAFER
BY
ATTORNEY

INVENTORS S. KUBA
R. C. SHAFER
BY
ATTORNEY

June 21, 1960   S. KUBA ET AL   2,942,093
ARTICLE ASSEMBLING APPARATUS
Filed July 24, 1958   4 Sheets-Sheet 4

INVENTORS: S. KUBA
R. C. SHAFER
BY
ATTORNEY

United States Patent Office 2,942,093
Patented June 21, 1960

2,942,093
ARTICLE ASSEMBLING APPARATUS

Samuel Kuba, Allentown, and Richard C. Shafer, Emmaus, Pa., assignors to Western Electric Company, Incorporated, New York, N.Y., a corporation of New York Filed July 24, 1958, Ser. No. 750,674

22 Claims. (Cl. 219—79)

This invention relates to apparatus for mounting parts on articles particularly apparatus for mounting leads on electrical articles.

In the manufacture of the various types of electrical units conductive leads for the units are provided in many ways. In most instances the units are of sufficient sizes to support leads of any desired structure, whereas in other instances the electrical units or articles are so small that they require leads of substantial structure to support them. For example, in the manufacture of transistors, the transistor bars must have their end portions secured to leads which are sufficiently strong to support the bar accurately in the head structure in the transistor unit. The leads in this instance are formed of a metallic ribbon of a given length, the ends of which are supported in holders of a turret-type machine such as that shown in the co-pending application of R. C. Shafer, Serial No. 745,388 filed June 30, 1958. In this illustration, radially positioned pairs of holders receive the lengths of ribbon and move them intermittently into processing stations where quantities of flux and solder are deposited at given positions thereon, a portion is cut from each ribbon between the deposits and the portions carrying the deposits are bent at right angles with respect to their ribbon portions and spaced in parallel relation with each other to receive the crystal bar therebetween for mounting.

The object of the present invention is an apparatus operable efficiently for mounting parts, particularly leads, on articles.

In accordance with the object, the invention comprises an apparatus for mounting a part on an article wherein the article is mounted in a gripper actuable to open and free the part for movement, the apparatus comprises companion elements actuable to grip an article and locate a portion thereof adjacent to but spaced from the part, and joining units for joining the part to the article.

More specifically, in the present instance, the apparatus is to secure an article to spaced ends of leads moved intermittently into a mounting station. To accomplish this, companion elements with gripping jaws are operated at a loading station to receive the article singly, while the jaws are held open, after which the jaws are caused to close on the article and be moved jointly into the mounting station where the ends of the article are located between parallel end portions of the leads but spaced therefrom. Heating units are caused to operate with spring pressed contacts to grip the leads and, when the leads are freed by opening the holders, move the leads into close engagement with the end portions of the article to secure the leads thereto. After mounting the article on the leads, the jaws are opened and returned to their loading position to receive the next article.

Other objects and advantages will be apparent from the following detailed description when considered in conjunction with the accompanying drawings, wherein:

Fig. 1 is a top plan view of the apparatus located at a mounting station of an article processing machine;

Fig. 2 is a fragmentary detailed view of the companion elements shown closed in solid lines, partially open in dotted lines and wide open in dot-dash lines;

Figure 3:
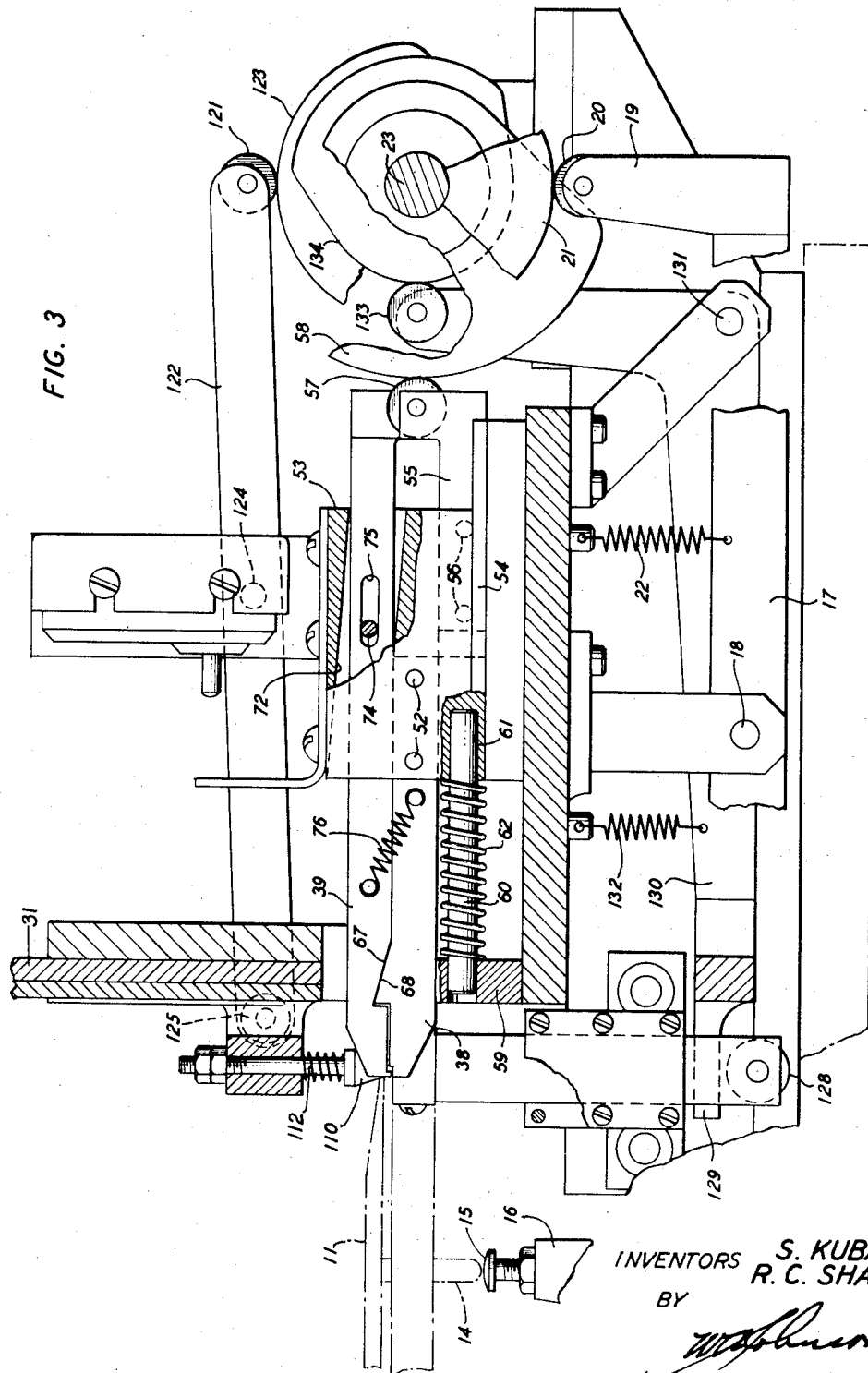
Fig. 3 is a vertical sectional view taken along the line 3—3 of Fig. 1.

The apparatus is mounted at a fixed position adjacent a mounting station indicated generally at 10 with respect to a turret-type machine, not shown, but illustrated in the aforementioned co-pending application, carrying radially extending pairs of grippers or holders 11 to bring ribbon-like leads 12 into the mounting station. The holders 11 in each pair are composed of a fixed lower member and a movable upper member, the latter being urged normally downwardly to cause firm gripping of the leads 12. The upper member of each holder 11 has a plunger 14 extending downwardly through the lower member thereof to be engaged by adjustable screws 15 mounted on an arm 16. The arm 16 is supported by a lever 17, Figs. 1 and 3, which is pivotally supported at 18 and provided with a vertical portion 19 on which a cam roller or follower 20 is mounted. The roller 20 is held in engagement with the cam 21 by a spring 22, the cam being mounted on a cam shaft 23. The cam shaft 23 is journaled in bearings 24 and has a gear 25 mounted on one end thereoof which interengages a gear 26 of a drive shaft 27. The drive shaft 27 is driven a given rotary distance during each interval of rest of the holders 11 or the turret supporting the holders to impart one complete cycle to the cam shaft 23 during this interval. The cam 21 operates its lever 17 during a predetermined portion of the operating cycle to open the holders 11 to free the leads 12 for movement toward each article 29.

Figure 4:
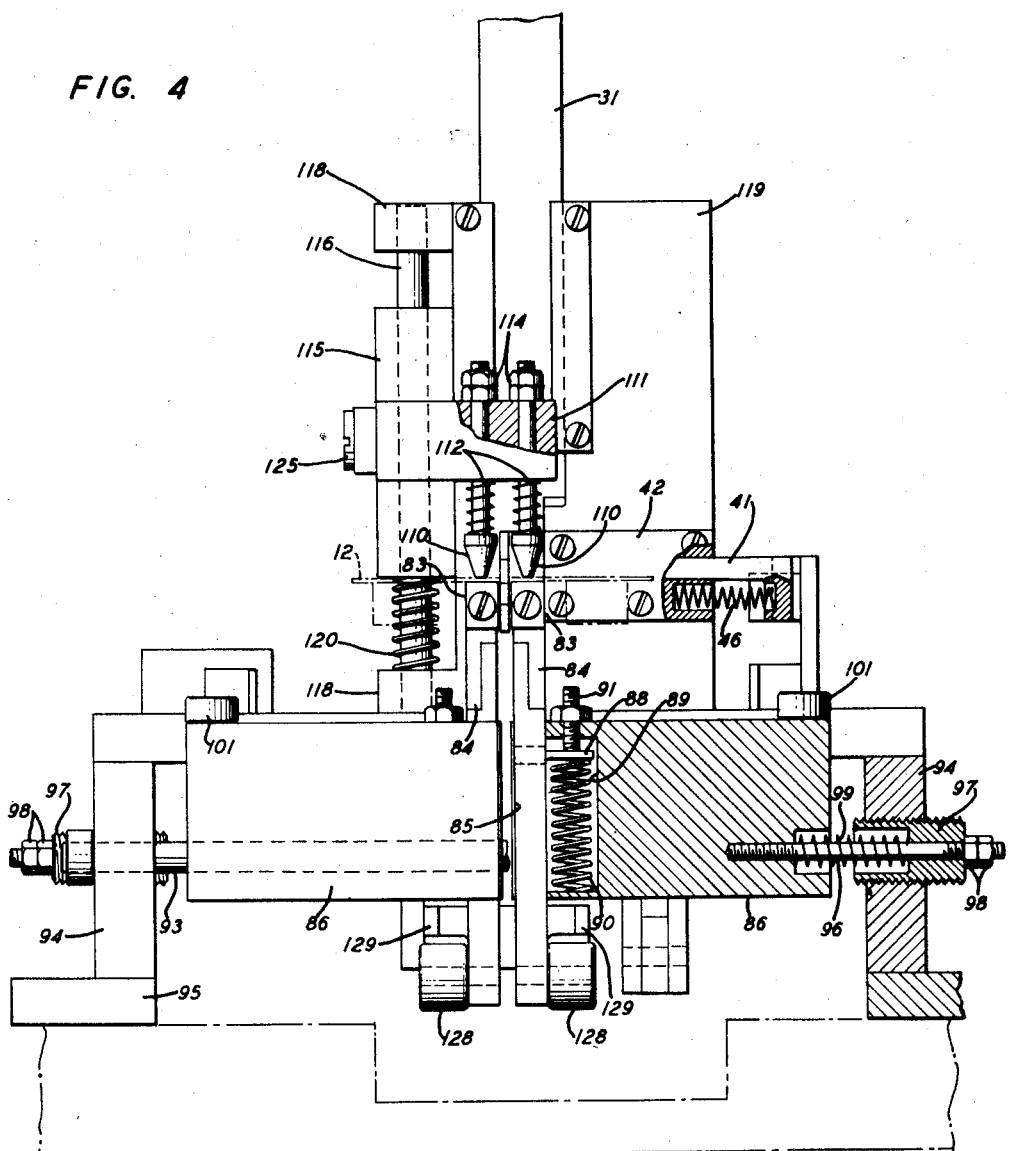
Fig. 4 is a vertical sectional view taken along the line 4—4 of Fig. 1.

The articles 29 are stacked in a hopper 31 and are allowed to move downwardly therein to rest successively on a table 32. A retaining latch 33 pivoted at 34 and urged by a spring 35 has its lower end 36 extending through a slot 37 in the hopper to engage the lowermost article 29 before it is released to drop on the table 32. The articles 29 are to be fed singly to gripping jaws of companion elements 38 and 39. The means to feed the articles to the jaws of the elements includes a bar 40 fixed to a slide 41 mounted for sliding movement in a guide 42. The slide 41 has a tapered surface 43, Fig. 1, at its outer end opposite the bar 40, which is held in engagement with a tapered surface 44 of a sliding cam 45 by a spring 46, Fig. 4. The sliding cam 45 is movable longitudinally in a stationary guide 47 and is urged to the right, Fig. 1, by a spring 48, to cause a cam follower 49, mounted on the right end of the sliding cam, to follow the contour of its cam 50. The cam 50 is mounted on the cam shaft 23 and has a contour to cause actuation of the sliding cam 45 to move slide 41 to feed an article 29 into the jaws of the elements 38 and 39 in the loading position.

The elements 38 and 39 are of the general contours shown in Fig. 3, the element 38 being fixedly mounted at 52 in a carriage 53 which is mounted for longitudinal movement in guides 54. An arm 55 fixed to the carriage 53 at 56 carries a roller or cam follower 57 disposed in engagement with its cam 58 which is mounted on the cam shaft 23. A rod 60 has one end mounted in an aperture 61 of the carriage 53, the other end being movable in an aperture of a fixed member 59. The rod supports a spring 62, Figs. 1 and 3, which normally urges the carriage 53 to the loading position. The element 38 has a horizontal surface 64 disposed in a given plane with the table 32 at the loading position where it will receive the successive articles 29 and at the mounting station where it will be in a desired plane for the location of the article between the parallel portions of the leads 12. The gripping jaw for the element 38 also has a vertical surface 65 cooperating with the horizontal surface 64 to locate each article 29 accurately between the leads 12. A projection 66 of the element 38 has a tapered or cam-like surface 67 to cooperate with a similar surface 68 of the element 39 to cause opening of the elements, or the gripping jaws thereof, when relative longitudinal movement is imparted to the elements. The element 39 has a horizontal surface 69 and a vertical surface 70 jointly cooperating with the surfaces 64 and 65 to complete the gripping jaws for the elements and to cause accurate location of each article for mounting on the leads.

The element 39 is disposed in an aperture 72 of the carriage 53, the side walls of the aperture controlling the position of the element 39 in the same plane with the element 38 whereas the upper and lower walls of the aperture permit movement of the element 39 in a path controlled not only by the relationships of the surfaces 67 and 68 but the relationship of a pin 74 of the carriage and an elongate aperture 75 of the element 39 permitting longitudinal and vertical movement of the element 39 relative to the element 38. Spring 76 connecting the elements 38 and 39 serves to urge the elements and the gripping jaws thereof into closed positions wherein the surfaces 69 and 70 of the jaw of the element 39 will force the article to closely engage the surfaces 64 and 65. A cam follower 78 mounted on the right end of the element 39 is positioned to be engaged by a segmental cam 79 mounted on the cam 58. The cam 79 functions to open the jaws of the elements 38 and 39, actually to cause movement of the element 39 relative to the element 38 into the dot-dash position, Fig. 2, after the article is mounted on the leads, to free the jaws for their return movement. Movement of the element 39 free of the article is in a straight line which will not disturb the article as the surface 64 is in a plane with the undersurface of the article. The element 39 has a projection 78' positioned to engage an adjustable stop 79' mounted at a fixed position to stop the element 39 short of the complete return movement of the carriage 53 to cause opening of the jaws of the elements 38 and 39 (see dotted line in Fig. 2) a distance sufficient to receive the next article 29.

When the articles or leads 12 are moved into the mounting station they are held firmly in position with their downwardly bent portions 82 spaced in known distance apart. The articles 29 are located accurately singly in the jaws of the elements 38 and 39 and moved centrally between the members 82 of the leads 12 but out of engagement therewith. Heating units 83 include suitable heating elements adapted, when energized, to heat the portions 82 sufficiently to melt the solder deposits, not shown, carried thereby for joining the portions 82 of the leads to the end portions or faces of the article 29.

The units 83 are mounted upon the upper ends of supports 84 which are movable vertically in guideways 85 of their respective carriages 86. Each support 84 has a projection 88 extending into a pocket 89 of its carriage 86 where a spring 90 normally urges the projection with the support upwardly to a position controlled by an adjustable stop 91 limiting the upward or vertical movement of each heating unit 83. The carriages 86 are supported for longitudinal movement toward and away from each other on parallel rods 93, the ends of which are mounted in vertical members 94 extending upwardly from a base 95. Each carriage 86 carries a rod 96 which extends through an externally threaded collar 97 mounted in its vertical member 94. Adjustable nuts 98 on the outer end of each rod 96 control the positions, to which the carriages 86 are urged toward each other by springs 99 to control the limit of movement of heating units 83 toward each other.

Each carriage 86 has a cam follower 101 rotatably mounted thereon to be engaged by cam surfaces 102 of sliding cam bars 103. The cam bars 103 are mounted for sliding movement in guides 104, only one of which is shown in Fig. 1 and are urged to the right by springs 105 to cause cam followers 106 mounted on the right ends of the bars to follow the contours of their cams 107 which are mounted on the cam shaft 23.

It is important that the heating units 83 be held de-energized during the absence of either or both leads 12 when their holders or grippers 11 are moved into the mounting station. It has been described how the heating units 83 may move horizontally. Their vertical movements position the heating units in engagement with the under sides of the leads to cooperate with identifying contacts 110 moved into engagement with the top sides of the leads. The contacts 110 are supported by an arm 111 normally urged downwardly and cushioned in their contacts with the leads 12 by springs 112. The limits of their downward movements are controlled by adjustable nuts 114. The arm 111 is supported by a slide 115 mounted on a rod 116, the ends of which are held in apertures of portions 118 of a vertical support 119. A spring 120 disposed concentric with the rod 116 normally urges the slide 115 upwardly and causes a cam follower 121 of a cam lever 122 to ride upon its cam 123. The cam 123 is mounted on the cam shaft 23, while the cam lever 122 is pivoted at 124 and connected at 125 to the arm 111.

The lower ends of the supports 84 carry rollers 128 positioned beneath adjacent ends 129 of a cam lever 130 which is pivotally mounted at 131 and urged clockwise by a spring 132 to cause a cam follower 133 to follow its cam 134. The cam lever 130, with its bifurcated portion including the ends 129 straddling the supports 84, is adapted to move the supports downwardly and to also free the supports to move the heating units vertically into engagement with the leads 12.

Figure 5:
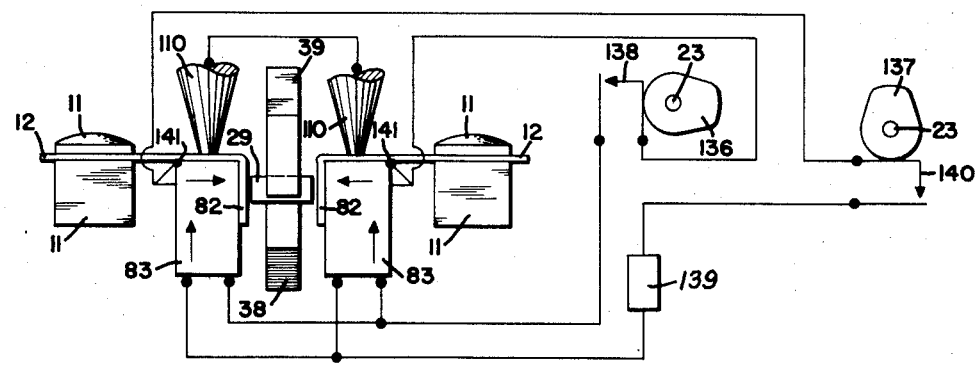
Fig. 5 is a schematic illustration of the circuits including the heating units during mounting of the article on the leads.
Figure 6:
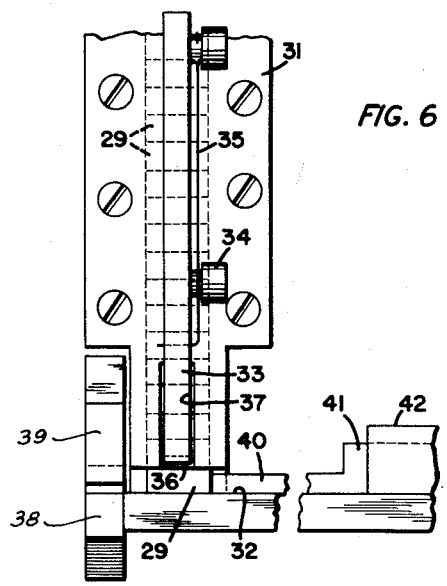
Fig. 6 is an enlarged fragmentary vertical sectional view illustrating the feeding of the articles to the elements.

The heating units 83 are under the control of cams 136 and 137 which are mounted on the cam shaft 23 as illustrated in the schematic wiring diagram in Fig. 5. Cam 136 is adapted to close a switch 138 to complete a circuit including a source of electrical energy 139 and the heating units 83. However, due to the importance of holding the heating units de-energized during the absence of one or both leads 12, cam 137 closes its switch 140 to complete a portion of the circuit which includes contacts 141 carried by the heating units, the leads 12 and the contacts 110. The contacts 141 are not parts of the heating units or their elements and are mounted out of possible engagement with the contacts 110. The absence of either lead 12 will hold this portion of the circuit open rendering the cam 136 closing the switch 138 ineffective to complete the circuits through the heating units.

*Operation*

During each interval of rest of the machine with the set of holders or grippers 11, one of these sets locates a pair of articles or leads 12 in the mounting station for an interval rest of the machine. During this interval of rest, the cam shaft 23 is moved one complete cycle and the cams thereon are mounted with respect to each other to bring about their functions in a predetermined order. At the starting or loading position, the elements 38 and 39 are held open as, during each return movement of the elements, the element 39 is prevented from returning the complete distance with the element 38 and the carriage 53, resulting in opening the jaws of the elements sufficiently to receive the article 29. Therefore, the first action is the feeding of the next article 29 to the gripping jaws of the elements 38 and 39. This is brought about by the cam 50 moving the sliding cam 45 to cause the slide 41 to move against its spring 46 to move the bar 40 a distance necessary to move the article 29 on the surface 64 of the jaw of the element 38 and locate it centrally thereon. While the feeding mechanism returns to its starting position, cam 58 causes forward movement of the carriage 53, first to move the element 38 relative to the element 39 to allow the springs 76 to close the jaws of the elements on the article 29. Closing of the jaws of the elements causes surface 69 to hold the article against surface 64 and causes surface 70 to move the article on surface 64 until the article is held against surface 65. Jointly the surfaces of the jaws cooperate to locate the article accurately. Additional movement of the carriage will move the elements to locate the article centrally between the parallel portions 82 of the leads and hold the article in this portion out of engagement with these portions of the leads.

The next action may be the combined action of the cam 134 and the cam 123, respectively, to cause upward movement of the heating units 83 until they engage the leads 12 from beneath and downward movement of the contacts 110 until they engage the lead from above. Following this action, cams 107, which have acted previously to move their cam bars 103 to the left to hold the heating units 83 predetermined distances away from each other, act at this time to free the cam bars 103 to move to the right. This action allows the springs 99 to move the carriages 86 inwardly to the predetermined mounting positions to move the leads 12 toward each other to force the portions 82 thereof into close engagement with the end portions of the article 29 so that the heat from the units 83 will heat the portions 82 sufficiently to melt the solder carried thereby and join the portions of the leads to the article. Prior to this action, including the lateral or horizontal motion of each unit 83, cam 21 operates its lever 17 to move the arm 16 upwardly to cause the members 15 to engage their respective plungers 14 to open the holders or grippers 11 to free the leads sufficiently so that they may be moved freely into positions where they are joined to the article. The heating units 83 are held in the positions at the ends of their vertical and horizontal movements until the joints between the portions 82 and the ends of the article 29 are completed after which the holders 11 are permitted to close to grip the leads at their new positions to hold them and the article joined thereto for movement out of the mounting station.

At this time, the article being gripped firmly in the jaws of the elements 38 and 39 and attached to the leads 12 must be freed from the jaws of the elements and allowed to continue its travel with the leads. This is accomplished by the segmental cam 79 carried by the cam 58 engaging its follower 78 to move the element 39 into the broken line position shown in Fig. 2 to open the gripping jaws of the elements prior to and hold them open during the first portion of the return movement of the elements to their loading positions. The surface 64 of the jaw of the element 39 is in a plane with the bottom surface of the article 29 and for this reason the element 38 may slide beneath the article without disturbing it after the article is mounted. The carriage 53 returns its full distance to the right and carries the element 38 with it. The element 39 is stopped short of following the carriage 53 for its full movement by the stop 79 engaging the projeciton 78. This action opens the jaws of the elements 38–39 to receive the next article. Prior to the completion of the rest period, the contacts 110 are returned to their up or starting position and the heating units are de-energized, moved laterally away from the portions 82 and downwardly away from the leads 12 to their starting positions. The apparatus is ready for the next cycle of operation to mount another article 29 on the next parts or leads 12 moved into the mounting station.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with grippers normally closed to firmly hold a part in an initial position and actuable to open and free the part for movement, of companion elements actuable to grip an article and locate a portion thereof adjacent to but spaced from the part, means operable to actuate the grippers into open position, a unit adapted to join the part to the article, and a support for the joining unit actuated to move the freed part relative to the open grippers into close engagement with the article for joining of the part to the article.

2. The combination with grippers normally closed to firmly hold a part in an initial position and actuable to open and free the part for movement, of companion elements actuable to grip an article and locate a portion thereof adjacent to but spaced from the part, means operable to actuate the grippers into open position, a unit adapted to join the part to the article, and a support for the joining unit actuated to move the free part relative to the open grippers into close engagement with the article for joining of the part to the article, the gripper actuating means being adapted to free the grippers to grip the part in its moved position and support the part and the joined article.

3. The combination with spaced pairs of grippers normally closed to firmly hold parts initially located at given spaced positions and actuable to open and free their parts for movement toward each other, of companion elements actuable to grip an article and locate spaced portions thereof adjacent to but spaced from their respective parts, means operable to actuate the grippers into open positions to free the parts for movement thereof, units energizable to join the parts to the portions of the article, and supports for the joining units actuated to cause the joining units to move the freed parts relative to their open grippers and into close engagement with their portions of the article for joining of the parts to the article.

4. The combination with spaced pairs of grippers normally closed to firmly hold parts initially located at given spaced positions and actuable to open and free their parts for movement toward each other, of companion elements having jaws normally closed to grip an article having spaced portions to be secured to their respective parts, means actuable to move the elements from a loading position where the elements receive the article to a loading position where the portions of the article will be disposed adjacent to but spaced from their parts, means operable to actuate the grippers into open positions to free the parts for movement thereof, units energizable to join the parts to the portions of the article, and supports for the joining units actuated to cause the joining units to move the freed parts relative to their open grippers and into close engagement with their portions of the article for joining of the parts to the article.

5. The combination with spaced pairs of grippers normally closed to firmly hold parts initially located at given spaced positions and actuable to open and free their parts for movement toward each other, of companion elements having jaws normally closed to grip an article having spaced portions to be secured to their respective parts, means actuable to move the elements from a loading position where the elements receive the article to a loading position where the portions of the article will be disposed adjacent to but spaced from their parts, a hopper for a supply of the articles disposed adjacent the loading position of the elements, means actuable to feed the articles singly to the jaws of the elements at the loading position, means operable to actuate the grippers into open positions to free the parts for movement thereof, units energizable to join the parts to the portions of the article, and supports for the joining units actuated to cause the joining units to move the freed parts relative to their open grippers and into close engagement with their portions of the article for joining of the parts to the article.

6. The combination with spaced pairs of grippers normally closed to firmly hold parts initially located at given spaced positions and actuable to open and free their parts for movement toward each other, companion elements having jaws adapted to grip singly articles having spaced portions to be secured to their respective parts, a carriage for the elements mounted for movement between given limits, one of the elements being fixed to the carriage so that its jaw will be located respectively at a loading position and a mounting position when the carriage is at its limits, the other element riding with the carriage and movable relative thereto and the fixed element, means to stop the movable element prior to the fixed element reaching the loading position to cause opening of the jaws of the elements to receive an article, means actuable to close the jaws on the article when the carriage moves the elements to the mounting position to locate spaced portions of the article between but spaced from their respective parts, means operable to actuate the grippers into open positions to free the parts for movement thereof, units energizable to join the parts to the portions of the article, and supports for the joining units actuated to cause the joining units to move the freed parts relative to their open grippers and into close engagement with their portions of the article for joining of the parts to the article.

7. In an apparatus for mounting parts on articles, a carriage mounted for movement between given limits respectively adjacent a loading position and a mounting position, a first element fixed to the carriage and having a jaw with a surface movable in a given plane between the loading and mounting positions, a second element mounted to ride with the carriage and the first element and movable relative thereto, the second element having a jaw adapted to close on the article and hold it in the jaw of the first element, means operable at the loading position to locate an article in the open jaws of the elements, and means to move the carriage to cause the elements to move the article to the mounting position.

8. In an apparatus for mounting parts on articles, a carriage mounted for movement between given limits respectively adjacent a loading position and a mounting position, a first element fixed to the carriage and having a jaw with a surface movable in a given plane between the loading and mounting positions, a second element mounted to ride wtih the carriage and the first element and movable relative thereto, the second element having a jaw adapted to close on the article and hold it in the jaw of the first element, means to stop the second element before reaching the loading position to hold its jaw open, means operable at the loading position to locate an article in the open jaws of the elements, means normally effective to move the second element to close the jaws, and means to move the carriage to cause the elements to move the article to the mounting position.

9. In an apparatus for mounting parts on articles, a carriage mounted for movement between given limits respectively adjacent a loading position and a mounting position, a first element fixed to the carriage and having a jaw with a surface movable in a given plane between the loading and mounting positions, a second element mounted to ride with the carriage and the first element and movable relative thereto, the second element having a jaw adapted to close on the article and hold it in the jaw of the first element, means to stop the second element before reaching the loading position to hold its jaw open, means operable at the loading position to locate an article in the open jaws of the elements, means normally effective to move the second element to close the jaws, means to move the carriage to cause the elements to move the article to the mounting position, and means operable to secure the article to a part in the mounting position.

10. In an apparatus for mounting parts on articles, a carriage mounted for movement between given limits respectively adjacent a loading position and a mounting position, a first element fixed to the carriage and having a jaw with a surface movable in a given plane between the loading and mounting positions, a second element mounted to ride with the carriage and the first element and movable relative thereto, the second element having a jaw adapted to close on the article and hold it in the jaw of the first element, means to stop the second element before reaching the loading position to hold its jaw open, means operable at the loading position to locate an article in the open jaws of the elements, means normally effective to move the second element to close the jaws, means to move the carriage to cause the elements to move the article to the mounting position, means operable to secure the article to a part in the mounting position, and means actuable to move the second element to move its jaw free of the mounted article prior to movement of the carriage toward the loading position.

11. The combination with spaced pairs of grippers normally closed to firmly hold parts initially located at given spaced positions and actuable to open and free their parts for movement toward each other, companion elements having jaws adapted to grip singly articles having spaced portions to be secured to their respective parts, a carriage for the elements mounted for movement between given limits, one of the elements being fixed to the carriage so that its jaw will be located respectively at a loading position and a mounting position when the carriage is at its limits, the other element riding with the carriage and movable relative thereto and the fixed element, means to stop the movable element prior to the fixed element reaching the loading position to cause opening of the jaws of the elements to receive an article, means actuable to close the jaws on the article when the carriage moves the elements to the mounting position to locate spaced portions of the article between but spaced from their respective parts, means operable to actuate the grippers into open positions to free the parts for movement thereof, units energizable to join the parts to the portions of the article, and supports for the joining units actuated to cause the joining units to move the freed parts relative to their open grippers and into close engagement with their portions of the article for joining of the parts to the article, an adjustable stationary member included in the stop means for the movable element to vary the position of the movable element is stopped adjacent the loading position to vary the opening of the jaws of the elements.

12. The combination with spaced pairs of grippers normally closed to firmly hold parts initially located at given spaced positions and actuable to open and free their parts for movement toward each other, of companion elements actuable to grip an article and locate spaced portions thereof adjacent to but spaced from their respective parts, means operable to actuate the grippers into open positions to free the parts for movement thereof, units energizable to join the parts to the portions of the article, supports for the joining units actuated to cause the joining units to move the freed parts relative to their open grippers and into close engagement with their portions of the article for joining of the parts to the article, means operable during a predetermined interval to close an electrical circuit including the heating units to energize the unit to join the parts to the article, and means rendered effective by the absence of either part to hold the circuit open and the units de-energized.

13. The combination with spaced pairs of grippers normally closed to firmly hold parts initially located at given spaced positions and actuable to open and free their parts for movement toward each other, of companion elements actuable to grip an article and locate spaced portions thereof adjacent to but spaced from their respective parts, means operable to actuate the grippers into open positions to free the parts for movement thereof, units energizable to join the parts to the portions of the article, supports for the joining units actuated to cause the joining units to move the freed parts relative to their open grippers and into close engagement with their portions of the article for joining of the parts to the article, contacts mounted for engagement with the parts, and a switch closed during predetermined intervals to close a circuit including a source of electrical energy, the units and the contacts to energize the units when the parts are in the grippers.

14. In an apparatus for mounting articles on leads including holders for successive pairs of leads to locate each pair of leads with spaced ends thereof disposed in given positions, the combination of companion elements actuable to grip successive articles with spaced portions and move the articles singly to locate the portions thereof adjacent the ends of their respective leads, heating units energizable when the leads are in their positions for securing the ends of the leads to the portions of each article, and circuits for the heating units held open by the absence of either lead to hold the heating units de-energized.

15. In an apparatus for mounting articles on leads including holders for successive pairs of leads to locate each pairs of leads with spaced ends thereof disposed in given positions, the combination of companion elements actuable to grip successive articles with spaced portions and move the articles singly to locate the portions thereof adjacent the ends of their respective leads, heating units for the leads, means actuable to move the heating units to force the ends of their leads into close engagement with the portions of an article gripped by the elements, and means actuable to energize the heating units to cause joining of the ends of the leads to their portions of the article.

16. In an apparatus for mounting articles on leads including holders for successive pairs of leads to locate each pair of leads with spaced ends thereof disposed in given positions, the combination of companion elements actuable to grip successive articles with spaced portions and move the articles singly to locate the portions thereof adjacent the ends of their respective leads, heating units energizable for securing the ends of the leads to the portions of each article, circuits for the heating units closed by the leads to energize the heating units and means operable to open the elements to free the mounted article.

17. In an apparatus for mounting articles on leads including holders for successive pairs of leads to locate each pair of leads with spaced ends thereof disposed in given positions, the combination of companion elements actuable to grip successive articles with spaced portions and move the articles singly to locate the portions thereof adjacent the ends of their respective leads, heating units for securing the ends of the leads to the portions of each article, means operable to open the elements to free the mounted article, and means to move the elements away from the mounted article.

18. In an apparatus for mounting articles on leads including holders for successive pairs of leads to locate each pair of leads with spaced ends thereof disposed in given positions, the combination of companion elements actuable to grip successive articles with spaced portions and move the articles singly to locate the portions thereof adjacent the ends of their respective leads, movable heating units for the leads, supports for the heating units, means normally urging the supports with the units away from the leads, means actuable to move the supports to force the ends of the leads against their portions of the article gripped by the elements, and means actuable to energize the heating units to cause joining of the ends of the leads to their portions of the article.

19. In an apparatus for mounting articles on leads including holders for successive pairs of leads to locate each pair of leads with spaced ends thereof disposed in given positions, the combination of companion elements actuable to grip successive articles with spaced portions and move the articles singly to locate the portions thereof adjacent the ends of their respective leads, movable heating units for the leads, supports for the heating units, means normally urging the supports with the units away from the leads, means actuable to move the supports to force the ends of the leads against their portions of the article gripped by the elements, means actuable to energize the heating units to cause joining of the ends of the leads to their portions of the article, and contacts movable into engagement with the leads to render the energizing means effective only when the leads are present in the holders.

20. In an apparatus for mounting articles on leads including holders for successive pairs of leads to locate each pair of leads with spaced ends thereof disposed in given positions, the combination of companion elements actuable to grip successive articles with spaced portions and move the articles singly to locate the portions thereof adjacent the ends of their respective leads, movable heating units for the leads, supports for the heating units, means normally urging the supports with the units away from the leads, means actuable to move the supports to force the ends of the leads against their portions of the article gripped by the elements, means actuable to energize the heating units to cause joining of the ends of the leads to their portions of the article, contacts movable into engagement with the leads to render the energizing means effective only when the leads are present in the holders, means operable to open the elements to free the article, and means operable to cause movement of the elements away from the mounted article.

21. In an apparatus for mounting articles on leads including a mounting station where successive pairs of leads are located with spaced ends thereof disposed at given positions during periods of rest between intermittent movements of holders for the pairs of leads, the combination of companion elements having first and second jaws respectively to receive articles with portions to be secured to their respective ends of the leads, means to move the elements to move their jaws between a loading position away from the leads and a mounting position adjacent the leads, means to cause opening of the jaws at the loading position to receive the articles singly, means to feed the articles singly to the jaws and means to secure the ends of the leads to their respective portions of the article.

22. In an apparatus for mounting articles on leads including a mounting station where successive pairs of leads are located with spaced ends thereof disposed at given positions during periods of rest between intermittent movements of holders for the pairs of leads, the combination of companion elements having first and second jaws respectively to receive articles with portions to be secured to their respective ends of the leads, means normally urging the jaws of the elements into closed positions to grip an article therein, means to move the elements to move their jaws between a loading position away from the leads and a mounting position adjacent the leads, means to cause opening of the jaws at the loading position to receive the articles singly, means to feed the articles singly to the jaws and means to secure the ends of the leads to their respective portions of the article.

References Cited in the file of this patent

UNITED STATES PATENTS

| | | |
|---|---|---|
| 2,034,560 | Bumstead | Mar. 17, 1936 |
| 2,494,474 | Fermanian et al. | Jan. 10, 1950 |
| 2,602,872 | Ziegler | July 8, 1952 |